United States Patent
Li (10) Patent No.: US 10,511,162 B2
(45) Date of Patent: Dec. 17, 2019

(54) RANGE EXTENDER AND CIRCUIT PROTECTION METHOD

(71) Applicant: General Electric Company, Schenectady, NY (US)

(72) Inventor: Fei Li, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 263 days.

(21) Appl. No.: 15/468,147

(22) Filed: Mar. 24, 2017

(65) Prior Publication Data

US 2017/0279264 A1 Sep. 28, 2017

(30) Foreign Application Priority Data

Mar. 25, 2016 (CN) .......................... 2016 1 0176811

(51) Int. Cl.
*H02H 7/12* (2006.01)
*H02H 3/24* (2006.01)
(Continued)

(52) U.S. Cl.
CPC .......... *H02H 7/1213* (2013.01); *H02H 3/243* (2013.01); *H02M 1/36* (2013.01); *H02M 3/04* (2013.01)

(58) Field of Classification Search
CPC ...... H02H 7/1213; H02H 3/243; B60L 53/20; B60L 58/20; B60L 2210/14; H02M 1/32;
(Continued)

(56) References Cited

U.S. PATENT DOCUMENTS 5,161,097 A * 11/1992 Ikeda ...................... G05F 1/563
323/222
5,710,699 A * 1/1998 King ...................... B60L 11/005
318/139
(Continued)

FOREIGN PATENT DOCUMENTS

CN 101370685 A 2/2009
CN 202222088 U 5/2012
(Continued)

OTHER PUBLICATIONS

Schmidhofer A et al., "Range extender optimisation for electrical vehicles", Industrial Technology, 2003 IEEE International Conference on, vol. 1, pp. 570-574, Dec. 10-12, 2003.
(Continued)

*Primary Examiner* — Kevin J Comber
(74) *Attorney, Agent, or Firm* — Meagher Emanuel Laks Goldberg & Liao, LLP (57) ABSTRACT

A circuit protection method comprises operating a range extender in a normal mode, wherein the range extender comprises at least one DC-to-DC converter having an input side and an output side and at least one bypass device coupled between the input side and the output side. The operating of the range extender in the normal mode comprises converting an input voltage at the input side into an output voltage at the output side by the DC-to-DC converter, wherein the output voltage is higher than a critical voltage. The method further comprises operating the range extender in a safety mode when the output voltage is lower than the critical voltage. The operating of the range extender in the safety mode comprises bypassing the DC-to-DC converter by the bypass device, wherein the critical voltage is lower than or equal to the input voltage.

12 Claims, 4 Drawing Sheets

(51) Int. Cl.
*H02M 1/36* (2007.01)
*H02M 3/04* (2006.01)

(58) Field of Classification Search
CPC .......... H02M 1/36; H02M 3/04; H02M 3/155; Y02T 10/7005; Y02T 10/7066; Y02T 10/7072; Y02T 10/7225; Y02T 90/127; Y02T 90/14
USPC .......................................................... 361/86
See application file for complete search history.

(56) References Cited

U.S. PATENT DOCUMENTS

| | | | |
|---|---|---|---|
| 8,598,455 | B2 | 12/2013 | Heien et al. |
| 8,648,572 | B2 | 2/2014 | Kiyohara et al. |
| 2006/0006850 | A1* | 1/2006 | Inoue .................... H02J 7/0065 323/265 |
| 2015/0311831 | A1* | 10/2015 | Yamada ................ H02J 7/0063 318/139 |
| 2016/0268902 | A1* | 9/2016 | Yamaguchi ............. H02M 1/32 |
| 2017/0274777 | A1* | 9/2017 | Alam ...................... B60L 11/02 |

FOREIGN PATENT DOCUMENTS

| | | |
|---|---|---|
| CN | 103359014 A | 10/2013 |
| CN | 103843215 A | 6/2014 |
| CN | 203761314 U | 8/2014 |
| CN | 203850889 U | 9/2014 |
| CN | 104303408 A | 1/2015 |
| CN | 104477041 A | 4/2015 |
| CN | 204340650 U | 5/2015 |
| DE | 10 2011 088 457 A1 | 6/2013 |
| WO | 2011072564 A1 | 6/2011 |

OTHER PUBLICATIONS

Gebrehiwot M et al., "Overvoltage protection for range extended electric vehicles", AFRICON, 2015, pp. 1-7, Sep. 14-17, 2015, Addis Ababa.

First office action and search issued in connection with corresponding CN Application No. 201610176811.6 dated Jan. 14, 2019 (Translation not available).

\* cited by examiner

RANGE EXTENDER AND CIRCUIT PROTECTION METHOD

BACKGROUND

Embodiments of the present disclosure relate to range extenders and circuit protection methods.

A range extender is an additional energy storage component mounted on an electric vehicle and configured to increase a mileage of the electric vehicle. In a normal operation mode of a range extender comprising a boost direct current converter, an output voltage of the range extender is higher than an input voltage, and closed-loop control is performed by a proportional-integral controller to stabilize the output voltage of the range extender. However, in case of a sudden increase in the electrical load, for example, an acceleration process of the electric vehicle, the output voltage will decrease suddenly, and then the proportional-integral controller will turn on switch device(s) located in a power transmission path of the range extender to pull up the output voltage. As a result, there is a positive voltage across an inductor in the power transmission path, which makes a current flowing through the inductor and the switch device increase rapidly. The switch device will be broken when the current increases to a value higher than a maximum current of the switch device. In some conventional methods, this problem is avoided by providing an over-current protection device. When the current increases to a value higher than a preset value, the over-current protection device will be triggered to turn off a main switch of the range extender to make the electrical load stop working, which will affect the normal operation of the electrical load. Especially for the electric vehicle, this will be very detrimental to users' driving safety.

Therefore, it is necessary to provide new range extenders and circuit protection methods to solve at least one of the above-mentioned problems.

BRIEF DESCRIPTION

A circuit protection method comprises operating a range extender in a normal mode, wherein the range extender comprises at least one DC-to-DC converter having an input side and an output side and at least one bypass device coupled between the input side and the output side. The operating of the range extender in the normal mode comprises converting an input voltage at the input side into an output voltage at the output side by the DC-to-DC converter, wherein the output voltage is higher than a critical voltage. The method further comprises operating the range extender in a safety mode when the output voltage is lower than the critical voltage. The operating of the range extender in the safety mode comprises bypassing the DC-to-DC converter by the bypass device, wherein the critical voltage is lower than or equal to the input voltage.

A range extender comprises at least one DC-to-DC converter having an input side and an output side, at least one bypass device coupled between the input side and the output side, and a controller. In a normal mode, the controller is configured to control the DC-to-DC converter to convert an input voltage at the input side to an output voltage at the output side, wherein the output voltage is higher than a critical voltage. In a safety mode, i.e., when the output voltage is lower than the critical voltage, the controller is configured have the DC-to-DC converter bypassed by the bypass device, wherein the critical voltage is lower than or equal to the input voltage.

A range extender comprises a first DC-to-DC converter, a second DC-to-DC converter, a first bypass device, a second bypass device and a controller. The first DC-to-DC converter has a first input side and a first output side. The second DC-to-DC converter has a second input side and a second output side, wherein the second output side is coupled to the first output side of the first DC-to-DC converter. The first bypass device is coupled between the first input side and the first output side. The second bypass device is coupled between the second input side and the second output side. In a normal mode, the controller is configured to control the first and second DC-to-DC converters to respectively convert a first input voltage at the first input side and a second input voltage at the second input side into an output voltage which is higher than a critical voltage. In a safety mode, i.e., when the output voltage is lower than the critical voltage, the controller is configured to have one of the first and second DC-to-DC converters which has the higher input voltage bypassed by the corresponding bypass device, wherein the critical voltage is lower than or equal to the higher one of the first and second input voltages.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The following is a concise description of these embodiments. It should be appreciated that in the development of any actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relates to a range extender which can be applied in an electric vehicle, for example, in a pure electric vehicle. The range extender can operate normally in case that an electrical load increases suddenly, and ensure continuous and stable operation of the electrical load. The range extender comprises at least one DC-to-DC converter, at least one bypass device connected in parallel with the DC-to-DC converter and a controller configured for controlling the DC-to-DC converter and the bypass device.

Figure 1:
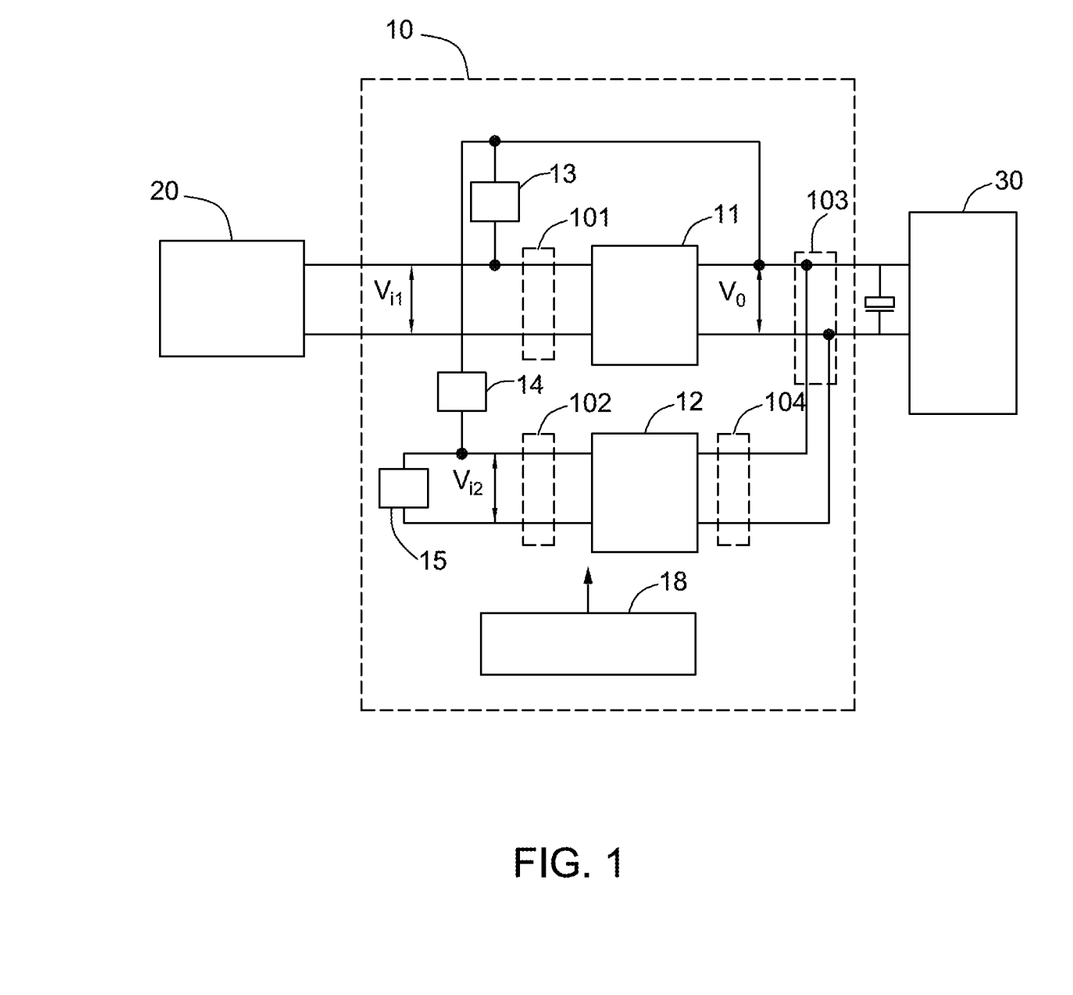
FIG. 1 is a sketch view of a range extender in accordance with an exemplary embodiment of the present disclosure.

Referring to FIG. 1, in the embodiment shown in FIG. 1, the range extender 10 is coupled between a first energy storage device 20 and an electric load 30. The first energy storage device 20 can provide energy to the electric load 30 through the range extender 10. The range extender 10 comprises a first DC-to-DC converter 11, a first bypass device 13 connected in parallel with the first DC-to-DC converter 11, a second DC-to-DC converter 12, a second bypass device 14 connected in parallel with the second DC-to-DC converter 12, a second energy storage device 15 and a controller 18.

The first DC-to-DC converter 11 has a first input side 101 and a first output side 103, and the first bypass device 13 is coupled between the first input side 101 and the first output side 103. As shown in FIG. 1, the first input side 101 is coupled to the first energy storage device 20, and the first DC-to-DC converter 11 receives a first input voltage $V_{i1}$ from the first energy storage device 20 via the first input side 101. The first output side 103 is coupled to the electric load 30, and the first DC-to-DC converter 11 provides an output voltage $V_O$ to the electric load 30 via the first output side 103. The first energy storage device 20 may comprise a high energy battery (such as a lead-acid battery), a super capacitor, a generator, a fuel cell, a photovoltaic inverter power supply or a combination thereof.

The second DC-to-DC converter 12 has a second input side 102 and a second output side 104, and the second bypass device 14 is coupled between the second input side 102 and the second output side 104. The second input side 102 is coupled to the second energy storage device 15, and the second DC-to-DC converter 12 receives a second input voltage $V_{i2}$ from the second energy storage device 15 via the second input side 102. The second output side 104 is coupled to the first output side 103, and also coupled to the electric load 30. The second DC-to-DC converter 12 provides the output voltage $V_O$ to the electric load 30 via the second output side 104. The second energy storage device 15 may comprise a super capacitor.

The first DC-to-DC converter 11 and the second DC-to-DC converter 12 may be a boost converter or a buck-boost converter working at a boost mode. The first DC-to-DC converter 11 and the first bypass device 13 constitute a first conversion unit, the second DC-to-DC converter 12 and the second bypass device 14 constitute a second conversion unit.

In some embodiments, the controller 18 can control the first conversion unit and the second conversion unit independently, and thus may be applied to the case where the first energy storage device 20 or the second energy storage device 15 alone provides energy to the electrical load 30. For example, a method for controlling the first conversion unit by the controller 18 will be described as following. A method for controlling the second conversion unit by the controller 18 is similar to the method for controlling the first conversion unit.

In a normal mode, the controller 18 controls the first DC-to-DC converter 11 to convert the first input voltage $V_{i1}$ at the first input side 101 to the output voltage $V_O$ at the first output side 103, wherein the output voltage $V_O$ is higher than a critical voltage, and the critical voltage is lower than or equal to the first input voltage $V_{i1}$. In the case of constant electric load, a value of the output voltage $V_O$ is basically constant under the control of the controller 18.

In the case that the electric load increases suddenly, the output voltage $V_O$ will decrease suddenly. When the output voltage $V_O$ decreases to the critical voltage, the safety mode will be triggered, and the controller 18 will have the first DC-to-DC converter 11 bypassed by the first bypass device 13. "Bypass" mentioned herein refers to connecting the input side and input side of a component, so that there is no current flowing through the component. As shown in FIG. 1, the controller 18 connects the first input side 101 and the first output side 103 by turning on the first bypass device 13, in order to bypass the first DC-to-DC converter 11. In this embodiment, after the first DC-to-DC converter 11 being bypassed, most current flows through the first bypass device 13 and there is nearly no current flowing through the first DC-to-DC converter 11, so that components therein will not be damaged and the over-current protection device will not be triggered to further stop the electrical load 30. Meanwhile, since the first bypass device 13 connects the first input side 101 and the first output side 103, the output voltage $V_O$ of the first output side 103 will be rapidly pulled up. When the output voltage $V_O$ increases to a value higher than the critical voltage, the controller 18 makes the first DC-to-DC converter 11 operate in the normal mode again. For example, the controller 18 may make the first DC-to-DC converter 11 switch back to the normal mode by turning off the first bypass device 13. In this way, the output voltage $V_O$ will not increase anymore after a period time of increasing, and then keep stable.

In the above embodiment, the operating condition of the normal mode is set as: the output voltage $V_O$ being higher than the critical voltage. When the output voltage $V_O$ is lower than or equal to the critical voltage, the safety mode will be operated. In specific operation, when the output voltage $V_O$ drops to the critical voltage, the safety mode is triggered, i.e., a triggering condition of the safety mode is set as: the output voltage $V_O$ decreasing to the critical voltage. In the above embodiment, the critical voltage may be lower than the first input voltage $V_{i1}$.

In other embodiments, the operating methods of the normal mode and the safety mode are similar to the method described in the above embodiments. Unlike the above embodiments, the operating condition of the normal mode is set as: the output voltage $V_O$ being higher than or equal to the critical voltage, and when the output voltage $V_O$ is lower than the critical voltage, the safety mode will be operated. In specific operation, when the output voltage $V_O$ drops to a value lower than the critical voltage, the safety mode will be triggered, i.e., the triggering condition of the safety mode is that the output voltage $V_O$ decreases to a value lower than the critical voltage.

In some embodiments, the critical voltage is equal to the first input voltage $V_{i1}$. When the output voltage decreases to a value lower than the first input voltage $V_{i1}$, the controller 18 switches the first conversion unit from the normal mode to the safety mode. When the output voltage increases to the first input voltage $V_{i1}$, the controller 18 switches the first conversion unit from the safety mode to the normal mode.

In other embodiments, the critical voltage is lower than the first input voltage $V_{i1}$. When the output voltage decreases to a value lower than the first input voltage $V_{i1}$, and at the same time a current flowing through the first DC-to-DC converter 11 does not reach a current value enough to trigger the over-current protection or a maximum current value of the first DC-to-DC converter 11, the controller switches the first conversion unit from the normal mode to the safety mode.

The first bypass device 13 may comprise a bypass switch which is turned off in the normal mode and is turned on in the safety mode. The bypass switch may be an active switch, such as transistor, and MOSFET. The controller 18 can control the active switch to be on or off by sending a control signal to the active switch.

Figure 2:
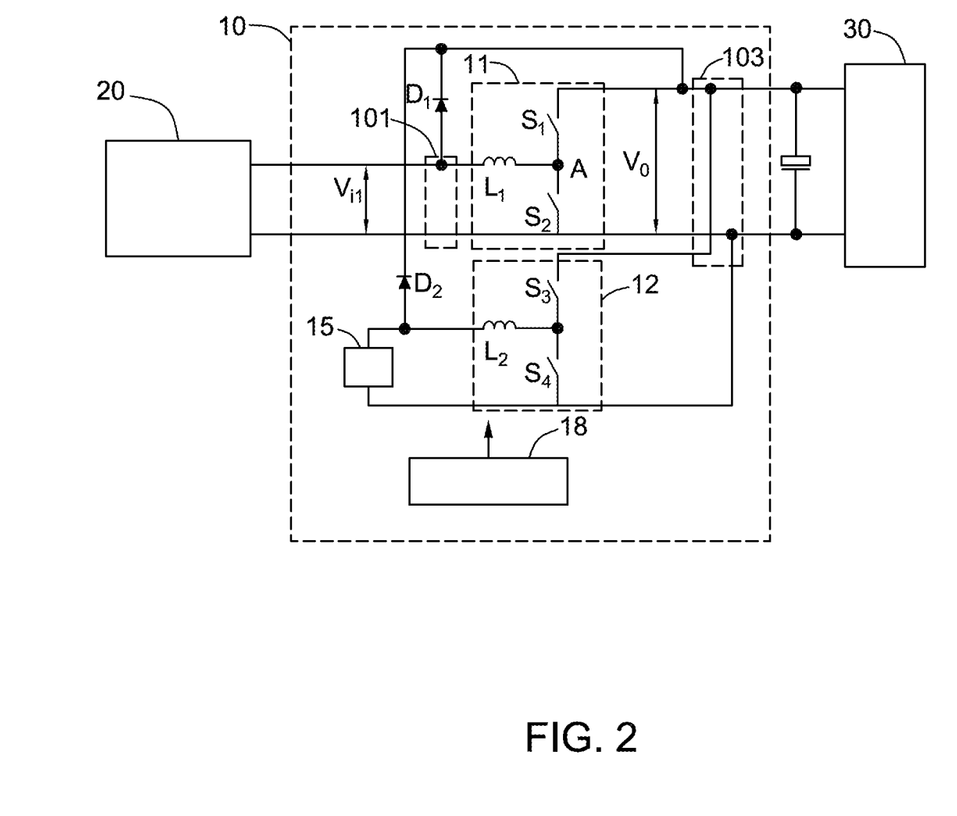
FIG. 2 is a sketch view of a range extender in accordance with another exemplary embodiment of the present disclosure.

Referring to FIG. 2, in some embodiments, the first conversion unit comprises the first DC-to-DC converter 11 and the first bypass device connected in parallel with the first DC-to-DC converter 11. The first DC-to-DC converter 11 comprises a first switch device S1, a second switch device S2 and a first inductor L1. The first switch device S1 and the second switch device S2 is coupled in series and across the first output side 103. The inductor L1 has a first end and a second end, wherein the first end is coupled to a point A between the first and second switch devices, and the second end is coupled to the first input side 101 of the first DC-to-DC converter 11. The first bypass device comprises a diode D1 having an anode coupled to the first input side 101 and a cathode coupled to the second output side 103. In the normal mode, the first energy storage device 20 provides energy to the electrical load 30 through the inductor L1 and the first switch device S1. In the safety mode, the inductor L1 and the first switch device S1 are bypassed by the diode D1, and the first energy storage device 20 provides energy to the electrical load 30 through the diode D1.

In some embodiments, a voltage drop of the diode can be negligible, and therefore the critical voltage is equal to the first input voltage $V_{i1}$. In the normal mode, the diode D1 is cut off and the first energy storage device 20 provides energy to the electrical load 30 through the first DC-to-DC converter 11. In the safety mode, the diode D1 is turned on to bypass the first DC-to-DC converter 11.

In other embodiments, the voltage drop of the diode is taken into account, and therefore the critical voltage is substantially equal to a difference between the first input voltage $V_{i1}$ and the voltage drop, wherein the voltage drop of the diode is in the range of about 0V to about 2V.

The second conversion unit comprises the second DC-to-DC converter 12 and the second bypass device connected in parallel with the second DC-to-DC converter 12. The second DC-to-DC converter 12 comprises a third switch device S3, a fourth switch device S4 and a second inductor L2. The second bypass device comprises a diode D2. Structures and functions of the second conversion unit are similar to those of the first conversion unit, which will not repeated here. The controller 18 may also control the second conversion unit independently. The method for controlling the second conversion unit is similar to the method for the first conversion unit, which will not repeated here.

In other embodiments, the controller 18 can control the first conversion unit and the second conversion unit simultaneously, and therefore can be applied to the case where the first energy storage device 20 and the second energy storage device 15 provide energy to the electrical load 30 at the same time. In this case, the critical voltage may be set to be lower than or equal to the higher one of the first and second input voltage.

Referring to FIG. 1 again, in the normal mode, the controller 18 controls the first DC-DC converter 11 and the second DC-DC converter 12 to convert the first input voltage $V_{i1}$ at the first input side 101 and the second input voltage $V_{i2}$ at the second input side 102 respectively into the output voltage $V_O$, wherein the output voltage $V_O$ is higher than the critical voltage. In some embodiments, the critical voltage may be equal to the higher one of the first and second input voltages. In the normal mode, the output voltage $V_O$ is higher than the higher one of the first and second input voltages.

When the output voltage $V_O$ drops to the critical voltage, the safety mode will be triggered, and then the controller 18 have one of the first and second DC-to-DC converters which has the higher input voltage bypassed by the corresponding bypass device. For example, if the first input voltage $V_{i1}$ is higher than the second input voltage $V_{i2}$, and the output voltage $V_O$ drops to the critical voltage, the safety mode of the first conversion unit will be triggered and the controller 18 will turn on the first bypass device 13 to bypass the first DC-to-DC converter 11. At this time, the first input side 101 and the first output side 103 are connected and the output voltage $V_O$ will increase rapidly. When the output voltage $V_O$ increases to a value higher than the critical voltage, the controller 18 will turn off the first bypass device 13 and make the first conversion unit operate in the normal mode again.

In the above described embodiments, the normal mode is operated when the output voltage $V_O$ is higher than the critical voltage, and the safety mode is operated when the output voltage $V_O$ is lower than or equal to the critical voltage. In other embodiments, the operating methods of the normal mode and the safety mode are similar to the above embodiments. The operating conditions of the normal mode and the safety mode are different from the above embodiments. In these embodiments, the operating condition of the normal mode is set as: the output voltage $V_O$ being higher than or equal to the critical voltage, and the operating condition of the safety mode is set as: the output voltage $V_O$ being lower than the critical voltage.

In some embodiments, when the first conversion unit is in the safety mode, the controller 18 makes the second conversion unit stop operating Specifically, the controller 18 keeps the second bypass device in an off-state and make the second DC-DC converter 12 stop working. For example, the controller 18 can stop the second DC-DC converter 12 by turning off the third switch device S3 and the fourth switch device S4. If the third switch device S3 and the fourth switch device S4 are active switches, the second DC-DC converter 12 can be turned off by sending a zero level signal to the third switch device S3 and the fourth switch device S4. When the first conversion unit switches from the safety mode back to the normal mode, the controller 18 makes the second conversion unit switch back to the normal mode.

The range extender may further comprise a detector which is configured to detect values of the first input voltage $V_{i1}$, the second input voltage $V_{i2}$ and the output voltage $V_O$. The range extender may further comprise a comparator which is configured to compare the output voltage $V_O$ and the critical voltage in real time to determine whether the output voltage $V_O$ is lower than or equal to the critical voltage. The comparator is also configured to compare the values of the first and the second input voltages.

Embodiments of the present disclosure also relates to a circuit protection method implemented by operating the above described range extender 10. In some embodiments, the first conversion unit and the second conversion unit can be independently controlled. Take the first conversion unit as an example, as shown is FIG. 3, a circuit protection method 40 comprises the following steps.

Figure 3:
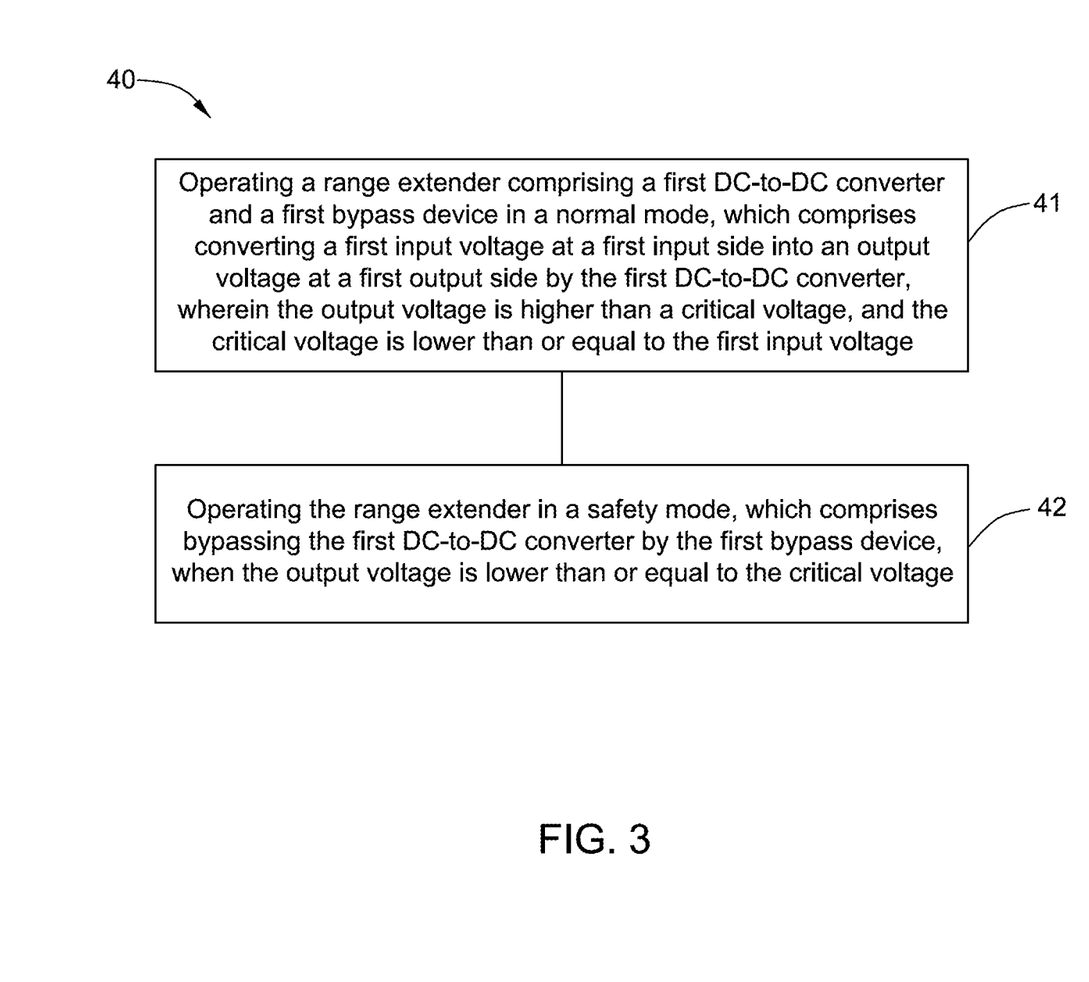
FIG. 3 is a flow chart illustrating a circuit protection method in accordance with an exemplary embodiment of the present disclosure.

In step 41, a range extender is operated in a normal mode. Specifically, a first DC-DC converter in the range extender converts an input voltage at a first input side into an output voltage at a first output side, wherein the output voltage is higher than a critical voltage, and the critical voltage is lower than or equal to the first input voltage.

In step 42, when the output voltage is lower than or equal to the critical voltage, the range extender is operated in a safety mode, which comprises bypassing the first DC-DC converter by the first bypass device.

In some embodiments, the first bypass device comprises a bypass switch. Step 41 further comprises turning off the bypass switch and step 42 further comprises turning on the bypass switch.

The method 40 may further comprise a step of judging, which comprises judging whether the output voltage is lower than or equal to the critical voltage. If the output voltage is higher than the critical voltage, the step 41 is performed, which comprises controlling the first DC-DC converter to operate normally i.e., convert the first input voltage into the output voltage. If the output voltage is lower than or equal to the critical voltage, the step 42 is performed, which comprises bypassing the first DC-DC converter by the first bypass device.

In some embodiments, the first DC-DC converter is coupled between the first energy storage device and the electrical load. The first DC-DC converter comprises a first switch device and a second switch device connected in series and across the output side, and a first inductor having a first end coupled to a node between the first and second switch devices and a second end coupled to the input side. Step 41 comprises transferring energy from the first energy storage device to the electric load through the first inductor and the first switch device. Step 42 comprises bypassing the first inductor and the first switch device. Step 42 comprises transferring energy from the first energy storage device to the electric load through the first bypass device.

In the above described embodiment, the normal mode is operated when the output voltage $V_O$ is higher than the critical voltage, and the safety mode is operated when the output voltage $V_O$ is lower than or equal to the critical voltage. In other embodiments, operating steps of the normal mode and the safety mode are similar to the operating steps described in the above embodiment. Operating conditions are different from the above embodiments. The operating condition of the normal mode is set as: the output voltage $V_O$ being higher than or equal to the critical voltage, and the operating condition of the safety mode is set as: the output voltage $V_O$ being lower than the critical voltage.

Figure 4:
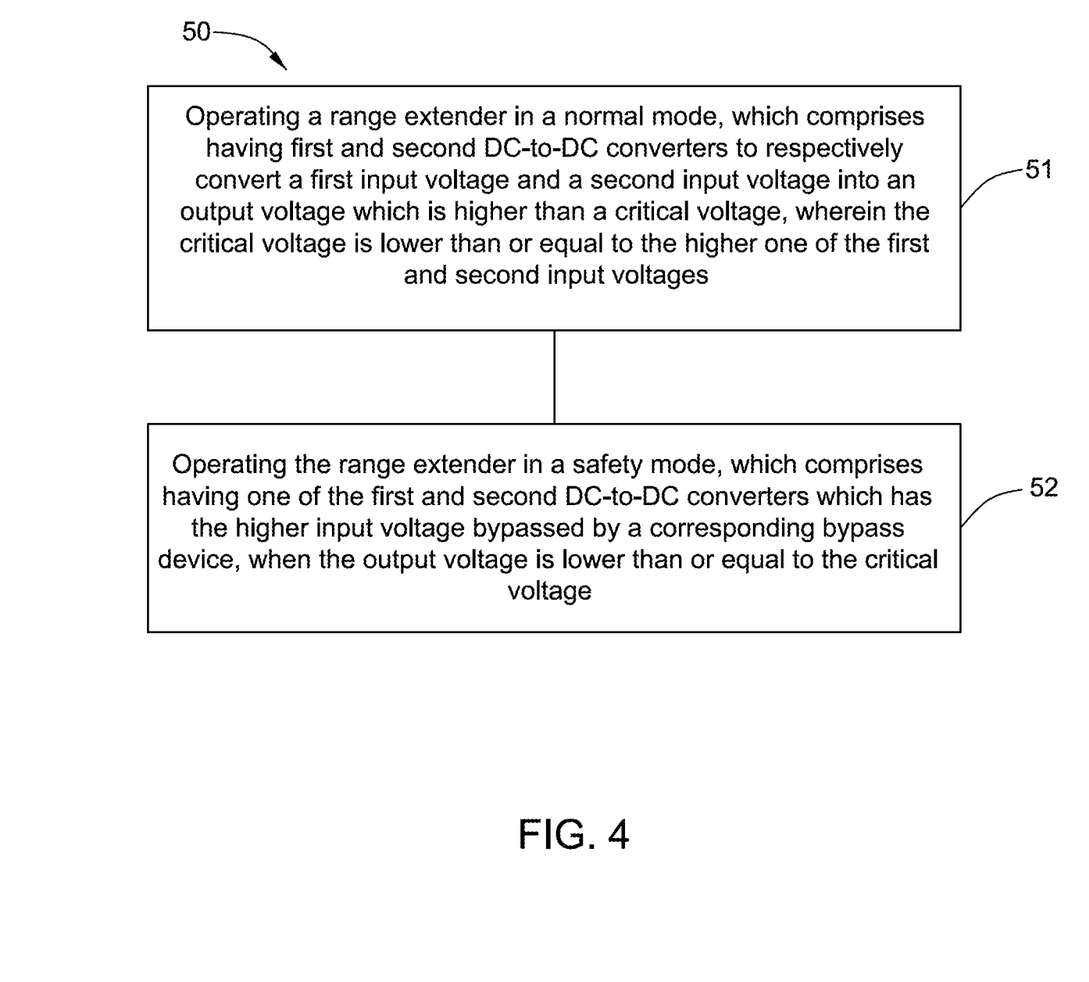
FIG. 4 is a flow chart illustrating a circuit protection method in accordance with another exemplary embodiment of the present disclosure.

In other embodiments, the controller 18 controls the first conversion unit and the second conversion unit simultaneously, and the critical voltage may be set to be lower than or equal to the higher one of the first and second input voltages. As shown in FIG. 4, a circuit protection method 50 comprises the following steps.

In step 51, a range extender is operated in a normal mode, which comprises having first and second DC-to-DC converters to respectively convert a first input voltage and a second input voltage into an output voltage, wherein the output voltage is higher than a critical voltage.

In step 52, when the output voltage is lower than or equal to the critical voltage, the range extender is operated in a safety mode, which comprises bypassing one of the first and second DC-to-DC converters which has the higher input voltage by a corresponding bypass device.

In the embodiments, step 52 may further comprise stopping the conversion unit having the lower input voltage. Specifically, the switch device in the DC-DC converter of the conversion unit is turned off and the bypass device of the conversion unit is also turned off The method 50 may further comprise a judging step for judging whether the output voltage is lower than the higher one of the first and the second input voltage.

In the above described embodiment, the normal mode is operated when the output voltage $V_O$ is higher than the critical voltage, the safety mode is operated when the output voltage $V_O$ is lower than or equal to the critical voltage. In another embodiments, the operating steps of the normal mode and the safety mode are similar to the above embodiments. The operating conditions of the normal mode and the safety mode are different from the above embodiments. The operating condition of the normal mode is set as: the output voltage $V_O$ being higher than or equal to the critical voltage, and the operating condition of the safety mode is set as: the output voltage $V_O$ being lower than the critical voltage.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

What is claimed is:

1. A range extender, comprising:
   a first DC-to-DC converter having a first input side and a first output side;
   a second DC-to-DC converter having a second input side and a second output side, wherein the second output side is coupled to the first output side;
   a first bypass device coupled between the first input side and the first output side;
   a second bypass device coupled between the second input side and the second output side; and
   a controller configured to selectively:
   control the first and second DC-to-DC converters to respectively convert a first input voltage at the first input side and a second input voltage at the second input side into an output voltage in a normal mode when the output voltage is higher than a critical voltage;
   control the first bypass device such that the first DC-to-DC converter is bypassed in a first safety mode when the output voltage is lower than or equal to the critical voltage and the first input voltage is higher than the second input voltage; and
   control the second bypass device such that the second DC-to-DC converter is bypassed in a second safety mode when the output voltage is lower than or equal to the critical voltage and the second input voltage is higher than the first input voltage;
   wherein the critical voltage is equal to a difference between the higher of the first and second input voltages and a voltage drop of the respective bypass device.

2. The range extender according to claim 1, wherein:
   the first bypass device comprises a first bypass switch;
   the second bypass device comprises a second bypass switch; and the controller is further configured to selectively:
open the first and second bypass switches in the normal mode;
close the first bypass switch in the first safety mode; and
close the second bypass switch in the second safety mode.

3. The range extender according to claim 1, wherein the first bypass device comprises a first diode having an anode coupled to the first input side and a cathode coupled to the first output side.

4. The range extender according to claim 1, wherein the second bypass device comprises a second diode having an anode coupled to the second input side and a cathode coupled to the second output side.

5. The range extender according to claim 1, wherein:
the first DC-to-DC converter comprises a first switch device and a second switch device coupled in series across the first output side and an inductor having a first end coupled between the first and second switch devices and a second end coupled to the first input side; and
the second DC-to-DC converter comprises a third switch device and a fourth switch device coupled in series across the second output side and an inductor having a first end coupled between the third and fourth switch devices and a second end coupled to the second input side.

6. The range extender according to claim 5, wherein:
the first DC-to-DC converter is coupled between a first energy storage device and an electric load;
the second DC-to-DC converter is coupled between a second energy storage device and the electric load; and
the controller is further configured to selectively:
operate the first and second DC-to-DC converters to transfer energy from the first and second energy storage devices to the electric load through the first and second inductors and the first and third switch devices in the normal mode;
operate the first bypass device to transfer energy from the first energy storage device to the electric load through the first bypass device in the first safety mode; and
operate the second bypass device to transfer energy from the second energy storage device to the electric load through the second bypass device in the second safety mode.

7. A range extender, comprising:
a first DC-to-DC converter having a first input side and a first output side;
a second DC-to-DC converter having a second input side and a second output side, wherein the second output side is coupled to the first output side;
a first bypass device coupled between the first input side and the first output side;
a second bypass device coupled between the second input side and the second output side; and
a controller configured to selectively:
control the first and second DC-to-DC converters to respectively convert a first input voltage at the first input side and a second input voltage at the second input side into an output voltage in a normal mode when the output voltage is higher than a critical voltage;
control the first bypass device such that the first DC-to-DC converter is bypassed in a first safety mode when the output voltage is lower than or equal to the critical voltage and the first input voltage is higher than the second input voltage; and
control the second bypass device such that the second DC-to-DC converter is bypassed in a second safety mode when the output voltage is lower than or equal to the critical voltage and the second input voltage is higher than the first input voltage.

8. The range extender according to claim 7, wherein:
the first bypass device comprises a first bypass switch;
the second bypass device comprises a second bypass switch; and
the controller is further configured to selectively:
open the first and second bypass switches in the normal mode;
close the first bypass switch in the first safety mode; and
close the second bypass switch in the second safety mode.

9. The range extender according to claim 7, wherein the first bypass device comprises a first diode having an anode coupled to the first input side and a cathode coupled to the first output side.

10. The range extender according to claim 7, wherein the second bypass device comprises a second diode having an anode coupled to the second input side and a cathode coupled to the second output side.

11. The range extender according to claim 7, wherein:
the first DC-to-DC converter comprises a first switch device and a second switch device coupled in series across the first output side and an inductor having a first end coupled between the first and second switch devices and a second end coupled to the first input side; and
the second DC-to-DC converter comprises a third switch device and a fourth switch device coupled in series across the second output side and an inductor having a first end coupled between the third and fourth switch devices and a second end coupled to the second input side.

12. The range extender according to claim 11, wherein:
the first DC-to-DC converter is coupled between a first energy storage device and an electric load;
the second DC-to-DC converter is coupled between a second energy storage device and the electric load; and
the controller is further configured to selectively:
operate the first and second DC-to-DC converters to transfer energy from the first and second energy storage devices to the electric load through the first and second inductors and the first and third switch devices in the normal mode;
operate the first bypass device to transfer energy from the first energy storage device to the electric load through the first bypass device in the first safety mode; and
operate the second bypass device to transfer energy from the second energy storage device to the electric load through the second bypass device in the second safety mode.

* * * * *